July 9, 1940.  R. E. CUSHING  2,207,658
REGULATING DEVICE
Filed Jan. 21, 1937  6 Sheets-Sheet 3

Fig. 3

Inventor:-
Russell E. Cushing
by his Attorneys
Howson & Howson

July 9, 1940.   R. E. CUSHING   2,207,658
REGULATING DEVICE
Filed Jan. 21, 1937   6 Sheets-Sheet 5

Inventor:-
Russell E. Cushing
by his Attorneys
Howson & Howson

July 9, 1940.  R. E. CUSHING  2,207,658
REGULATING DEVICE
Filed Jan. 21, 1937  6 Sheets-Sheet 6

Inventor:—
Russell E. Cushing
by his Attorneys
Howson & Howson

Patented July 9, 1940

2,207,658

UNITED STATES PATENT OFFICE 2,207,658

REGULATING DEVICE

Russell E. Cushing, Wyandotte, Mich., assignor to Pennsylvania Salt Manufacturing Company, Philadelphia, Pa., a corporation of Pennsylvania Application January 21, 1937, Serial No. 121,718

3 Claims. (Cl. 74—116)

This invention relates to regulating or control devices adapted to maintain or regulate automatically a desired condition. The invention is capable of general application and is useful in any instance wherein it is desired to actuate automatically some correcting or regulating means in response to variations of the condition being controlled or maintained. A few examples of the uses to which the invention may be applied are:—The control of the flow of material, the control of electrical current or potential by means of a regulating device such as an electrical rheostat, the control of the course of a ship or the like by automatic actuation of the ship's rudder, the control of the temperature of a furnace by regulation of the fuel supply thereto, etc. Many other possible uses of the invention will be apparent to those skilled in the art.

One object of the invention is to provide a novel regulating or control device wherein an oscillatory movement is variably translated to effect automatic actuation of correcting or regulating means in response to variations of the condition being regulated or controlled and in an amount depending upon the magnitude of such variations, and wherein the said translation is effected by means requiring relatively small power or energy expenditure.

Another object of the invention is to provide a novel regulating or control device of this character employing a two-way clutch for the said translation and adapted to effect a variable nudging corrective action in opposite directions, the clutch being controlled in response to variations of the condition being regulated or maintained. More particularly, a floating-element clutch is employed for this purpose. By a floating-element clutch is meant a clutch employing freely-disposed movable elements which are adapted to engage associated clutch members to interconnect the said members frictionally. Such a clutch will usually comprise cylindrical or spherical floating elements which are adapted to enter tapered areas or recesses formed by the associated clutch members to thus connect the clutch members for operation in a certain direction. Clutches of this general character have been used, for example in the so-called "overrunning clutch" devices. The present invention provides a novel two-way clutch of this general character and a novel adaptation of the clutch in a control or regulating device wherein regulating or correcting action is effected in opposite directions and in response to variations of the condition being controlled.

Another object of the invention is to provide novel means for limiting the range of actuation of the regulating or correcting means in one or both directions whenever desired. This feature is useful in instances such as that described in detail hereinafter.

Other objects and features of the invention will appear hereinafter.

A typical example of the various uses to which the invention may be applied is the automatic control of the flow of a fluid through a pipe or conduit. Using this application as a basis for a clear disclosure of the invention and its mode of operation, the accompanying drawings illustrate the invention as applied to the regulation or control of the flow of a corrosive gas, such as chlorine. By the employment of the invention, a regular and constant supply of gas may be obtained despite changes of pressure in the supply line.

Figure 1:
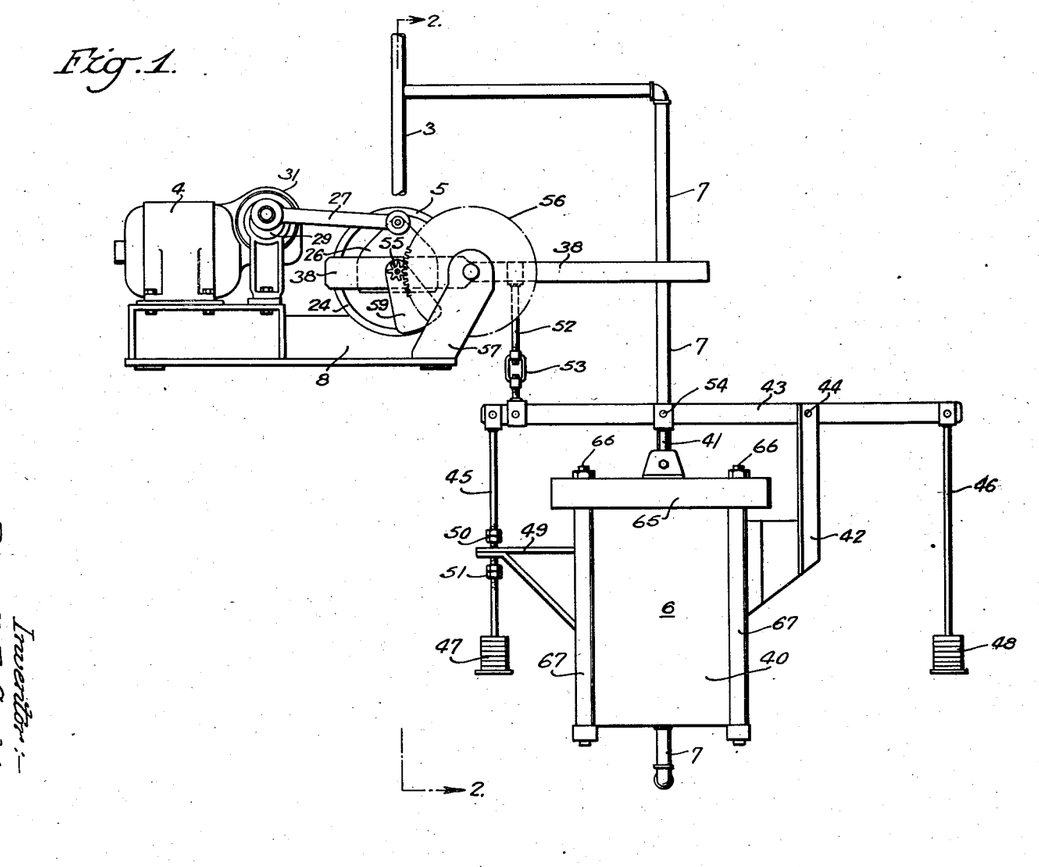
Fig. 1 is an elevational view of the apparatus.
Figure 2:
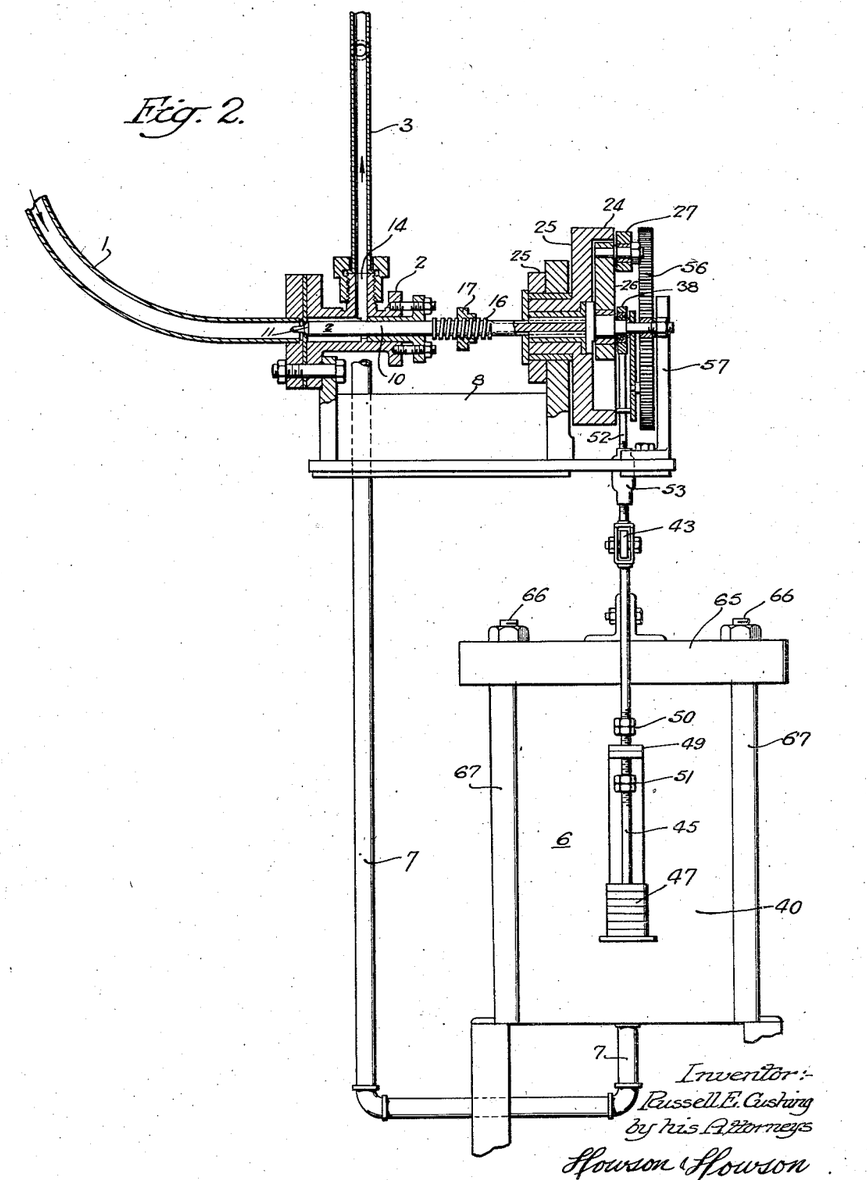
Fig. 2 is a sectional view taken along line 2—2 of Fig. 1.

Referring particularly to Figs. 1 and 2, there is shown a gas supply pipe 1 leading to a valve designated generally by reference character 2, and a gas outlet pipe 3 leading from the valve, the gas flowing through the said pipes and the valve in the direction of the arrows shown in Fig. 2. By means of the present invention, the flow of gas through the pipe 3 is regulated or maintained substantially constant by actuating the valve 2 in accordance with variations in pressure of the gas in the pipe 3. The valve 2, therefore, is in this instance the regulating or correcting means and is simply representative of any regulating or correcting means in any of the numerous possible adaptations of the invention.

The valve 2 is actuated by the motor 4 through the medium of the oscillatory mechanism described hereinafter and the two-way floating-element clutch 5, the action of which is controlled by a pressure-responsive device 6 which is connected to the pipe 3 by means of the branch pipe 7.

Figures 4, 4A:
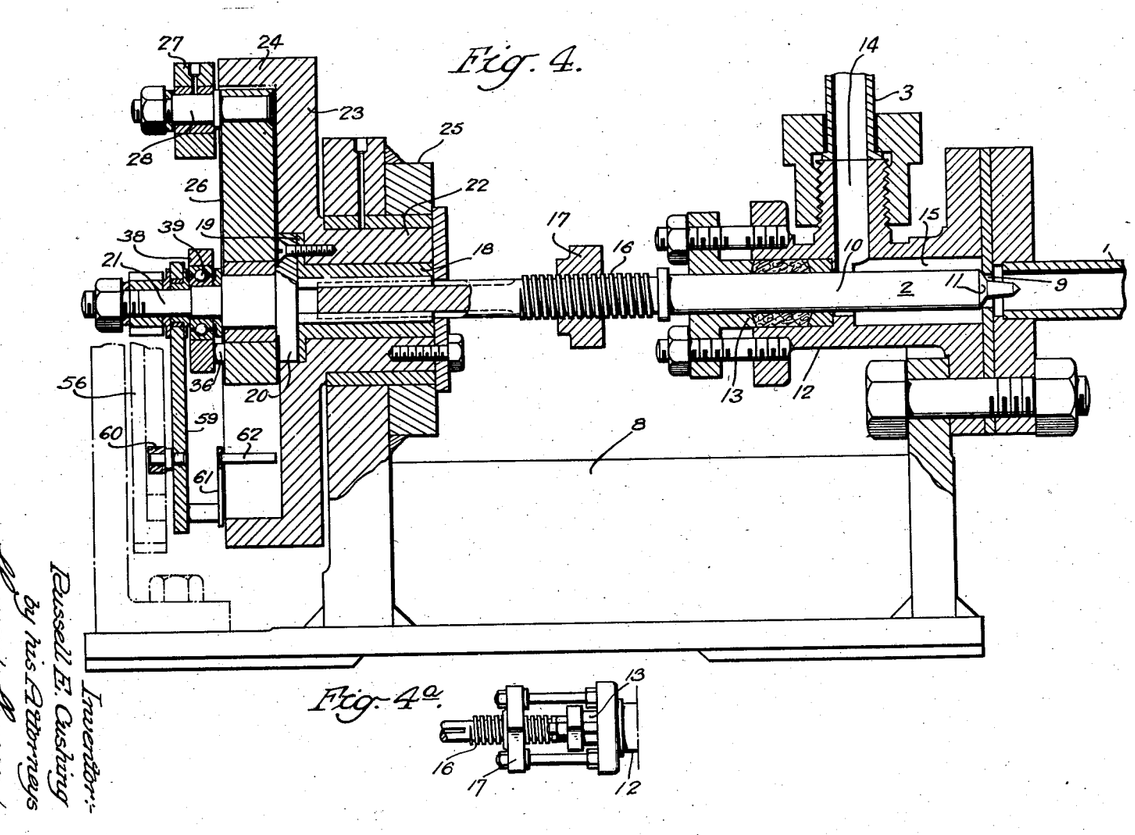
Fig. 4 is a detail sectional view taken along line 4—4 of Fig. 3.
Fig. 4A is a fragmentary plan view showing a detail.

Referring now to Fig. 4, the valve 2, together with its associated elements is carried by the supporting base 8. The valve comprises a valve seat or opening 9 and an axially movable rotatable valve member 10 whose end 11 is adapted for cooperation with the valve seat 9. The valve stem 10 extends into the valve casing 12 through a gland 13. Within the valve casing, there are provided communicating passages 14 and 15 through which the gas flows as it passes through the valve.

The extending portion of the valve stem 10 is threaded as shown at 16 and is cooperatively associated with a stationary threaded yoke 17 supported by the valve casing 12, as shown in Fig. 4A. The outer end of the valve stem extends into and is splined to a sleeve 18 having a flange 19 to which there is secured the flange 20 of a shaft 21. The sleeve 18 is seated within the hub 22 of a clutch member 23 having a peripheral flange 24. The flanges 19 and 20 are secured to the hub 22, as clearly illustrated, thus connecting the sleeve 18, the shaft 21, and the clutch member 23 together. The hub portion 22 of the clutch member 23 is rotatably mounted within the bearing structure 25 supported by the base 8. It will be seen that rotation of the clutch member 23 effects rotation of the valve stem 10, and the threaded engagement of the valve stem with the stationary yoke 17 causes axial movement of the valve stem, this being permitted by spline association of the valve stem with the sleeve 18.

Figure 3:
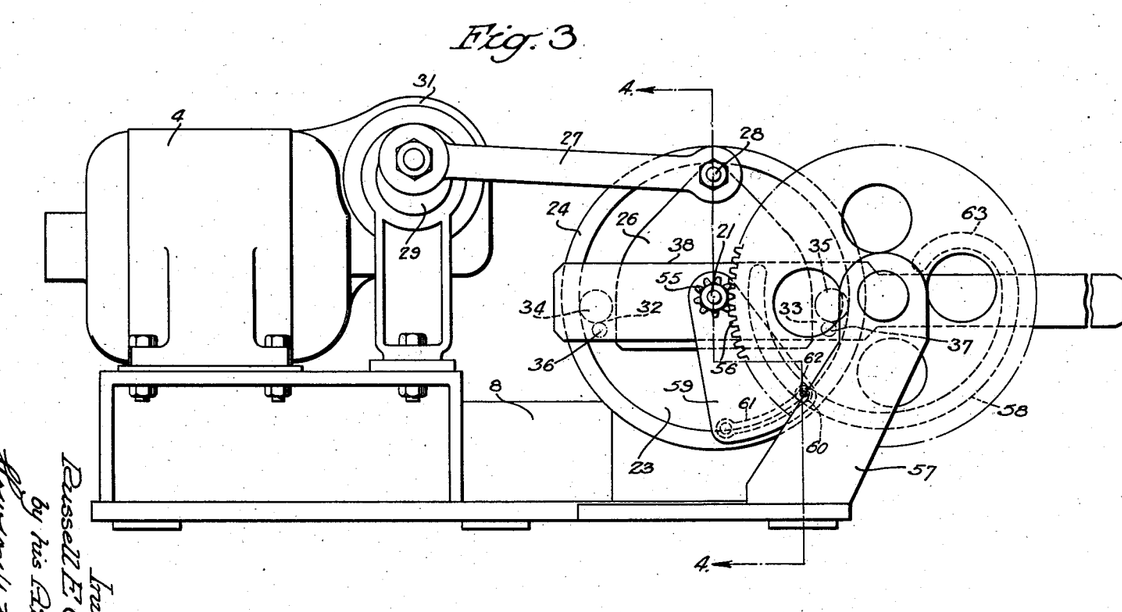
Fig. 3 is an enlarged elevational view of the two-way floating-element clutch and the motor-actuated oscillatory mechanism associated therewith.

A clutch member 26 shaped as shown in Figs. 1 and 3 is disposed within the flange 24 of the clutch member 23 and is freely supported by the shaft 21 so that it may rotate relative to the shaft. An arm or rod 27 has one end pivotally connected to the clutch member 26 by means of the pin connection 28. The other end of the arm 27 is connected to a crank wheel 29 which is driven by motor 4 through a speed reducer 31. For the particular purpose in view, the motor 4 may be a ¼ horse power motor with a speed of about 1700 R. P. M. The speed reduction may be such that the crank wheel 29 is driven at a speed of about 60 R. P. M. The crank wheel may have a throw of about one inch so as to cause oscillation or reciprocation of the rod 27 through a distance of one inch. The clutch member 26 is thus oscillated about the shaft 21 through a small arc corresponding to the small range of oscillation of the connecting rod 27. The motor 4 is run continuously so that it oscillates the clutch member 26 continuously but since the clutch member 26 is normally disconnected from the clutch 23 and is freely rotatable on the shaft 21, these continuous oscillations will normally have no effect upon the valve 2. When the condition being controlled (in this instance the flow of the gas) varies from the desired or normal value, however, the clutch comprising members 23 and 26 is rendered effective and serves to translate the oscillatory movement of rod 27 to effect actuation of the valve 2, as described hereinafter.

As shown in Fig. 3, the clutch member 26 is so shaped that it forms with the flange 24 a pair of diametrically opposed areas 32 and 33 which are defined by the side walls of the flange 24 and the member 26. These areas taper or diminish in width downward, as clearly illustrated. Within these areas, there are provided a pair of cylindrical elements 34 and 35, respectively, which elements are freely or floatingly disposed within their respective areas under the influence of gravity. These cylindrical elements are of such size that if either of them is allowed to fall under the influence of gravity, it becomes operative as described hereinafter. Normally, however, these elements are maintained in inoperative position by pins 36 and 37, respectively, carried by arm 38 which is freely supported upon shaft 21 by means of bearing 39. The arm 38 also serves to keep the elements 34 and 35 within their respective areas. It will be seen then that the arm 38 is adapted to pivot about the shaft 21 and, when this arm is disposed in horizontal position, as shown in Fig. 3, the pins 36 and 37 maintain the elements 34 and 35 in inoperative position. If the arm 38 is tilted clockwise about the shaft 21, the element 35 is permitted to lower, while the element 34 is raised higher and is maintained inoperative. If, on the other hand, the arm 38 is tilted counterclockwise, the element 34 is permitted to become operative, while the element 35 is maintained inoperative. Thus, the arm 38 is adapted to render the elements 34 and 35 operative selectively. The purpose of this and the specific manner of operation of elements 34 and 35 will be more clearly understood later.

Figure 8:
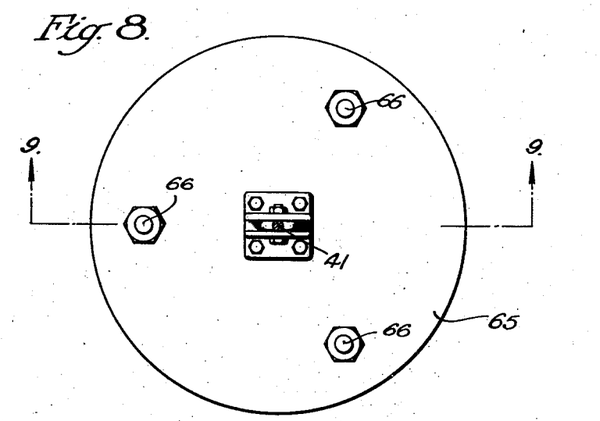
Fig. 8 is a plan view of the pressure-responsive device.

The arm 38 is actuated in accordance with the flow or pressure of the gas in the outlet conduit 3 by means of the mechanism now to be described. The pressure-responsive device 6 may take the form of a conventional device employing a diaphragm or a movable bell actuated by the pressure of the gas supplied to the device 6 through the branch circuit 7. Device 6, therefore, may comprise a stationary casing 40 within which there is disposed a vertically movable bell 64 (see Fig. 9). The pipe 7 extends well up into the bell as illustrated. The bell which is carried by the rod or pin 41 in turn carries an apron 65 which extends over the edge of casing 40. This apron may serve to direct downward any gas that might escape, so as to reduce the possibility of any harmful effect of the gas, and it may also serve to carry guide pins or rods 66 slidably disposed within guides 67. In the present instance, three such guide pins (see Fig. 8) and their associated guides are employed but it will be understood that any desired number may be employed. The guides 67 may be formed as an integral part of the casing structure. During operation, the bell 64 moves vertically, carrying with it the apron 65 and the guide pins 66. The guide pins serve to prevent lateral movement of the bell, while permitting its vertical movement within the casing 40. If desired, the guide pins or rods may carry rollers or may be otherwise modified to reduce friction opposing the vertical motion of the bell.

Figure 9:
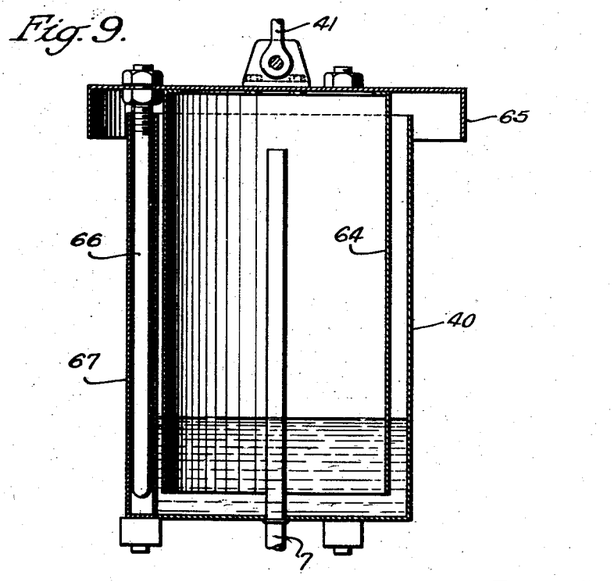
Fig. 9 is a sectional view taken along line 9—9 of Fig. 8.

As shown in Fig. 9, a liquid seal is provided to prevent escape of gas and admission of air. A suitable liquid is placed in casing 40 to a depth such that an increase in gas pressure under bell 64 sufficient to depress the level of the liquid in the bell to its lower edge raises the liquid level in the annular space between bell 64 and casing 40 to a point just below the upper edge of casing 40, thereby permitting the maximum buoyancy of the bell to be developed without the loss of gas from the bell or liquid from the container.

A bracket 42 (see Fig. 1) supported by the casing 40 serves to pivotally support an arm or beam 43, the pivotal support being shown at 44. To the opposite ends of the beam 43, there are attached rods 45 and 46 which carry weights 47 and 48, respectively. The rod 45 passes slidably through an apertured bracket 49 and threadedly carries nuts 50 and 51 on opposite sides of the bracket. The bracket 49 serves cooperatively with the nuts 50 and 51 to limit the range of movement of beam 43. It will be apparent that the range of movement of the beam 43 in either direction may be varied as desired by adjustment of the nuts 50 and 51 along the threaded portion of rod 45.

The arm 38 is connected to the beam 43 by means of link 52 which includes a turn buckle 53 to permit adjustment of the effective length of the link. The upper end of the rod 41 is connected to beam 43 at 54.

Assuming a given design and adjustment of the various parts, the beam 43 is normally balanced so as to assume a substantially horizontal position, as shown in Fig. 1, when the pressure in the outlet conduit 3 has a certain value corresponding to the desired rate of flow of gas through the conduit 3. The arm 38 is thus normally maintained in horizontal position and the elements 34 and 35 are maintained inoperative as shown in Fig. 3. Should the pressure of the gas decrease, the rod 41 will lower due to the lowering action of the pressure-responsive bell of device 6. Consequently, the beam 43 will be moved counterclockwise about its pivot 44 and, in so doing, will effect clockwise movement of the arm 38. As a result, the element 35 will become operative as explained above. By virtue of its being lowered slightly, the element 35 is wedged between member 26 and flange 24 during counterclockwise movement of the member 26, which movement increases the downward taper of the area 33 or, in other words, diminishes the width of the lower part of area 33. Consequently, during the counterclockwise movement of member 26, the element 35 forms a frictional connection between member 26 and member 23. As a result, the valve stem 10 is rotated slightly in a manner to open the valve 2, thus increasing the flow of gas through the conduit 3. As long as the element 35 remains in its lowered position, each successive counterclockwise movement of the oscillating member 26 will rotate the valve stem slightly so that the valve will be opened with a nudging action. During the successive clockwise movements of the member 26, however, the lower part of the area 33 will be widened thus effecting release of element 35 and permitting it to become disengaged and to fall onto pin 37, or to bottom of area 33 if pin 37 has been lowered a distance greater than one-half of the full movement of member 26. When the gas pressure in conduit 3 has returned to normal, the beam 43 will have returned to its normal position and, in turn, will have returned arm 38 to its normal position, the element 35 then being inoperative.

Figure 5:
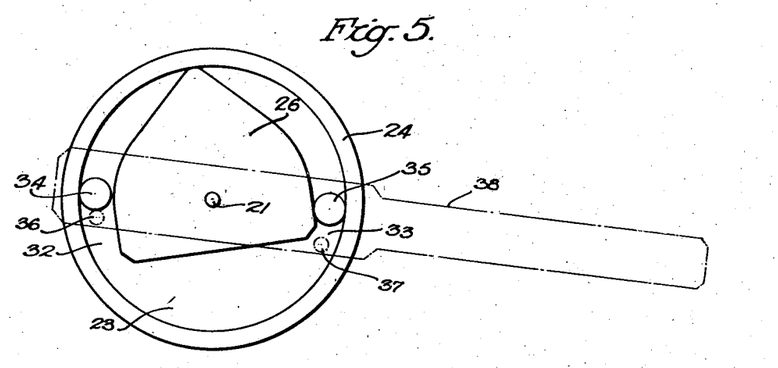
Figs. 5 and 6 are face views of the clutch illustrating the action thereof.
Figure 6:
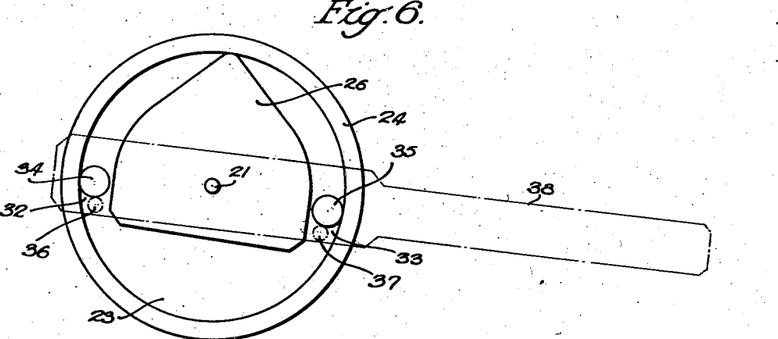

The above-described action may be more clearly seen by reference to the illustrations of Figs. 5 and 6. In these illustrations, the arm 38 is represented as having moved clockwise about its pivot a slight amount in response to decrease of the gas pressure. The element 35 has, therefore, become operative while the element 34 is maintained inoperative as above described. In Fig. 5, the oscillating member 26 is shown at one end of its oscillating stroke or movement, while in Fig. 6, this member is shown at the other end of its oscillating stroke. It will be seen that as the member 26 moves clockwise, as viewed in these figures, from the position of Fig. 5 to the position of Fig. 6, it releases the element 35, allowing this element to drop onto its supporting pin 37. During the initial movement of member 26 from the position of Fig. 5, it simply tends to roll the element 35 downward along the inner wall of flange 24. It will be apparent that the clutch member 23 will not be actuated by member 26 through the element 35 during this movement of member 26.

As the member 26 moves counterclockwise from the position of Fig. 6 to the position of Fig. 5, it will engage the element 35 and will tend to lift the element 35 somewhat to some position, such as that of Fig. 5, and, at the same time, the element 35 will become wedged in the tapered area 33, thus forming a frictional connection between member 26 and member 23. Consequently, the member 23 will be actuated until member 26 reaches the end of its stroke, as shown in Fig. 5. It will be apparent that the portion of the stroke of member 26 during which the member 23 is actuated by member 26 will depend upon the position of pin 37 as determined by the position of arm 38. If the pin 37 is lowered a distance greater than one-half the full movement of member 26, the element 35 will be effective throughout the entire counterclockwise stroke of member 26. Thus, the amount of actuation of the valve 2 is dependent on the extent of the variation of the flow or pressure of the gas.

Should the gas pressure increase to a value above normal, the pressure-responsive bell of device 6 will rise, causing clockwise movement of beam 43 and counterclockwise movement of arm 38. The element 34 will, therefore, become operative but will be effective only during clockwise movement of the oscillating member 26. Consequently, the valve 2 will be closed with a nudging action, thus reducing the gas flow and pressure in the conduit 3.

In either case, the successive movements of the valve stem are determined in their amounts by the instant positioning of the element 34 or 35, whichever is operative at the time; that is to say, the cooperation of the oscillating member 26 with the element 34 or 35 to nudge the valve will depend upon the instant position of the said element. Thus, the clutch serves to variably translate the oscillating movement of rod 27 and effects nudging actuation of the valve in variable increments. When a deviation in pressure or flow of the gas takes place, the gradual return to normal effected by the nudging of the valve will cause the element 34 or 35 to gradually return to its inoperative position by virtue of the gradual return of the associated parts of the device to their normal positions. Therefore, the successive nudging of the valve during the return to normal will become less, the nudging of the valve tapering off so to speak as the normal condition is approached. In other words, the nudging action varies with the extent that the condition being controlled is off the control point or normal value at any given instant, the nudging action diminishing as the condition approaches the control point or normal value. This makes for accurate control and prevents overthrow or "hunting" of the corrective means.

It will be seen then that the thrust of the connecting rod 27 is controlled in its application to the valve both as to the direction of application and the amount of the thrust which becomes effective. The device requires very little power to thus control the thrust developed by the connecting rod 27. All that is required is the energy necessary to tilt arm 38 through its small range of movement. Therefore, the device is enabled to respond very accurately to changes in the condition being controlled and functions efficiently to correct variations of the condition.

In a practical application of the device to the control of the flow of chlorine gas, the valve was in commercial operation passing about 18 cubic feet of gas per minute at a pressure of 8 lbs. The pressure was raised from 8 to 20 lbs. over a period of approximately one minute, during which time, the volume of gas passed by the valve increased to 18¾ cubic feet per minute but was prevented from increasing beyond that amount by virtue of the rapid closing of the valve by the device. This was a particularly severe test since the normal variation in pressure would not exceed 10 lbs. over a period of one hour.

It will be noted that the device may be adjusted to maintain any desired condition; that is to say, the parts of the device, as shown in Fig. 1, may be adjusted so that when the beam 43 is in a certain position corresponding to the desired condition, the arm 38 is in horizontal position. The adjustment may be effected by varying the weights 47 and 48 or by varying the points of connection of the various elements to the beam 43 or by resorting to both methods. This will be apparent from the elementary principles of lever or beam action since the beam 43 is simply a pivoted lever or beam acted upon by a plurality of forces.

In the event of failure of the supply of gas, the pressure-responsive bell would fall and the valve would be opened continuously by the nudging action above described. In the absence of some means to prevent it, the opening of the valve might continue until the valve stem were twisted off after the valve had reached its full open position. In accordance with the invention, this is prevented by the mechanism now to be described. On the shaft 21, there is provided a pinion gear 55 which meshes with a large gear 56 rotatably supported by means of the journal support 57. The pinion 55 causes the gear 56 to revolve approximately ½ a revolution while the valve stem 10 is traveling from its closed position to its opened position. The gear 56 has cut in its face a slot or groove 58. An arm 59 (see Fig. 4) is freely supported upon shaft 21 and carries a roller 60 which rides in the groove 58. The arm 59 also carries a crank-shaped member 61, the projecting end 62 of which is disposed within the flange 24 and is adapted to engage the element 35, as will be explained presently.

In the event of failure of the gas supply, as above mentioned, the valve will be continuously opened by the action of element 35 which will then be in a lowered position. During the valve-opening action, the pinion 55 will be rotated counter-clockwise, as viewed in Fig. 3, and the gear 56 will be rotated clockwise. As the valve stem approaches its fully opened position, the roller 60 will ride into the portion 63 of the groove 58 and the gear 56 will then act as a cam to raise the arm 59 until the pin 62 engages the element 35 and raises it into inoperative position. The nudging action of the valve will then be interrupted and injury to the mechanism prevented.

Figure 7:
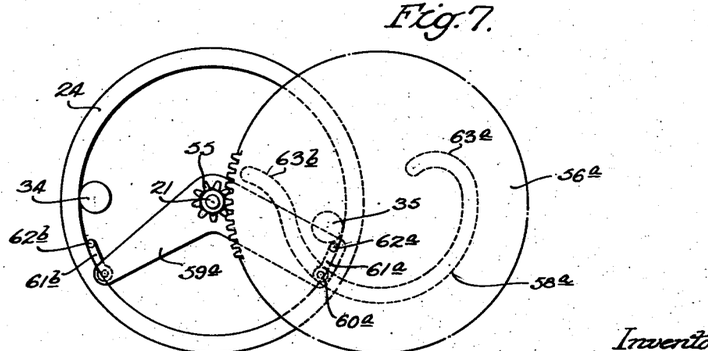
Fig. 7 illustrates an alternative form of the device.

In Fig. 7, there is illustrated a modification by means of which the range of actuation of the valve or corrective means may be limited in both directions. Thus, in the device illustrated, the closing movement of the valve as well as the opening movement thereof may be limited. Likewise, in the application of the invention to any control system, the range of movement of the correcting means may be limited.

Referring to Fig. 7, the pinion 55 meshes with a gear 56a corresponding to the gear 56 of the embodiment above described. In this instance, however, the gear 56a is provided with a groove 58a having end cam portions 63a and 63b. The portion 63a extends radially inward of the gear 56a, while the cam portion 63b extends radially outward. A member 59a corresponding to the arm 59 above described is pivotally mounted on the shaft 21 and has two extending arms, one of which carries a roller 60a and a crank-shaped member 61a, while the other arm carries a crank-shaped member 61b. These crank-shaped members have extending pins 62a and 62b, respectively, which correspond to the pin 62 above described. The pin 62a is cooperatively associated with the element 35, while the pin 62b is cooperatively associated with the element 34. The roller 60a rides in the groove 58a.

Assuming that the elements 34 and 35 are positioned as shown in Fig. 7 in response to decrease of the gas pressure causing the element 35 to become operative, the counterclockwise movement of shaft 21 which is thus effected, as described above, will cause clockwise movement of the gear 56a. When the roller 60a rides into portion 63a of the groove 58a, the pin 62a will be moved upward, thus lifting the element 35 into inoperative position and limiting the opening movement of the valve. When the gas pressure decreases and the element 34 becomes effective, the shaft 21 will be moved clockwise to close the valve and the gear 56a will be rotated counterclockwise. When the roller 60a rides into the portion 63b of the groove 58a, the member 59a will be moved clockwise about the shaft 21, causing pin 62b to rise and lift the element 34 to inoperative position. Thus, the device limits the movement of the valve or correcting means in either direction.

As previously stated, the invention is applicable in any instance where it is desired to control or maintain a desired condition and there are many uses to which the invention may be applied. The specific application of the invention described herein is not to be considered as limiting the invention but is merely illustrative of the general principles of the invention. Of course, the correcting means and the condition-responsive means will take the forms of devices commonly employed in control systems to which the invention may be applied. For example, in the control of temperature, the correcting means may be a fuel-supply valve while the condition-responsive means may be a pyrostat or thermostat adapted to exert control electrically in accordance with the temperature.

In any case, the correcting or regulating means will be actuated by the member 23 and the position of arm 38 will be controlled by the condition-responsive means. The manner in which this is effected in any instance is merely a matter of mechanical skill and simply involves the use of conventional devices well known to persons skilled in the art of control systems.

It will be understood, of course, that various changes and modifications may be made without departing from the scope of the invention. For example, instead of relying upon gravity to effect movement of the clutch elements, any other suitable force may be used for this purpose, such as the force of a spring, a blast of air, a magnetic field, etc. Other possible variations and modifications will be apparent to those skilled in the art.

I claim:

1. A device for imparting adjustable intermittent rotary movement to a rotatable member in opposite directions, comprising a first clutch member connected to said rotatable member to drive the same, a second clutch member arranged cooperatively with said first clutch member, means for continuously oscillating said second clutch member through a predetermined constant arc, said clutch members having cooperative surfaces forming a pair of opposed restricted tapered areas, a clutch element freely disposed in each tapered area and adapted to couple said clutch members through variable portions of movement of said second clutch member in opposite directions, to thereby impart rotary movement to said rotatable member, said tapered areas and said clutch elements being of such relative size and shape that each clutch element may move to an ineffective position or to a plurality of different effective positions in its tapered area, and means for selectively rendering either of said clutch elements effective and for varying the position of the effective element in its tapered area, the direction of rotary movement of said rotatable member depending upon which of said clutch elements is effective, and the amplitude of such movement during each operating cycle depending upon the position of the effective clutch element in its tapered area.

2. A device for imparting adjustable intermittent rotary movement to a rotatable member in opposite directions, comprising a first clutch member connected to said rotatable member to drive the same, a second clutch member arranged cooperatively with said first clutch member, means for continuously oscillating said second clutch member through a predetermined constant arc, said clutch members having cooperative surfaces forming a pair of opposed restricted tapered areas, a clutch element freely disposed in each tapered area and adapted to couple said clutch members through variable portions of movement of said second clutch member in opposite directions, to thereby impart rotary movement to said rotatable member, said tapered areas and said clutch elements being of such relative size and shape that each clutch element may move to an ineffective position or to a plurality of different effective positions in its tapered area, and a control member for maintaining either one of said clutch elements in ineffective position while simultaneously adjusting the other element to a selected one of its effective positions but permitting movement of the effective element in its tapered area during operation, the direction of rotary movement of said rotatable member depending upon which of said clutch elements is effective, and the amplitude of such movement during each operating cycle depending upon the position of the effective clutch element in its tapered area.

3. A device for imparting adjustable intermittent rotary movement to a rotatable member in opposite directions, comprising a first clutch member connected to said rotatable member to drive the same, a second clutch member arranged cooperatively with said first clutch member, means for continuously oscillating said second clutch member through a predetermined constant arc, said clutch members having cooperative surfaces forming a pair of opposed restricted tapered areas, a clutch element freely disposed in each tapered areas and adapted to couple said clutch members through variable portions of movement of said second clutch member in opposite directions, to thereby impart rotary movement to said rotatable member, said tapered areas and said clutch elements being of such relative size and shape that each clutch element may move to an ineffective position or to a plurality of different effective positions in its tapered area, means for selectively rendering either of said clutch elements effective and for varying the position of the effective element in its tapered area, the direction of rotary movement of said rotatable member depending upon which of said clutch elements is effective, and the amplitude of such movement during each operating cycle depending upon the position of the effective clutch element in its tapered area, and means for automatically moving the effective clutch element to an ineffective position after predetermined rotary movement of said rotatable member in one direction.

RUSSELL E. CUSHING.